(12) United States Patent
Dobmeier

(10) Patent No.: US 6,729,468 B1
(45) Date of Patent: May 4, 2004

(54) CIRCULAR SAW BLADE HOLDER

(76) Inventor: Thomas N Dobmeier, 81 Sawgrass Ct., Hamburg, NY (US) 14075

( * ) Notice: Subject to any disclaimer, the term of this patent is extended or adjusted under 35 U.S.C. 154(b) by 0 days.

(21) Appl. No.: 10/401,851

(22) Filed: Mar. 28, 2003

(51) Int. Cl.[7] .............................................. B65D 85/02
(52) U.S. Cl. ...................... 206/303; 206/349; 206/493; 206/806
(58) Field of Search ................. 206/303, 349, 206/806, 807, 493

(56) References Cited

U.S. PATENT DOCUMENTS

| | | | | |
|---|---|---|---|---|
| 3,259,231 A | * | 7/1966 | Romanowski et al. | 206/349 |
| 4,848,571 A | * | 7/1989 | Fullar | 206/303 |
| 5,078,266 A | * | 1/1992 | Rackley | 206/349 |
| 5,456,057 A | * | 10/1995 | Bannon et al. | 206/349 |
| 6,011,472 A | * | 1/2000 | Pendergraph et al. | 206/807 |
| 6,161,689 A | * | 12/2000 | Reithel | 206/303 |
| 6,267,239 B1 | * | 7/2001 | Maki | 206/349 |
| 6,446,797 B1 | * | 9/2002 | Shiga | 206/303 |

* cited by examiner

Primary Examiner—Luan K. Bui

(57) ABSTRACT

A simple molded packaging device for a circular saw blade where the packaging securely retains the circular saw blade where a full inspection, both visual and tactile, may be made by a consumer prior to purchase of the circular saw blade while preventing the consumer from removing the circular saw blade from the packaging and securely replacing the circular saw blade relative to the packaging. Means provide for simple one time release of the circular saw blade from the packaging. Means provide for securement of a security tag relative to the packaging where ready undetectable tampering by the consumer with the security tag is prevented. Sonic welding is disclosed as the preferred method of both securing the circular saw blade relative to the packaging and securing a closure of a security tag compartment with a security tag contained therein.

16 Claims, 9 Drawing Sheets

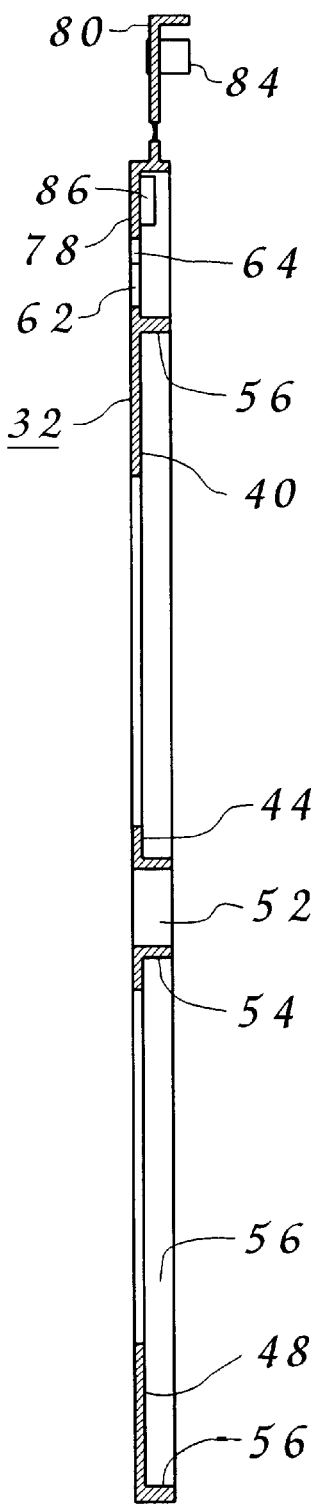
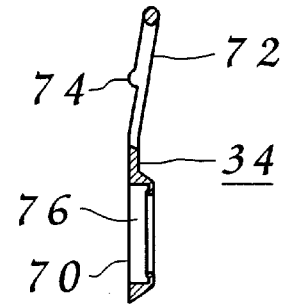
FIG. 4
FIG. 5
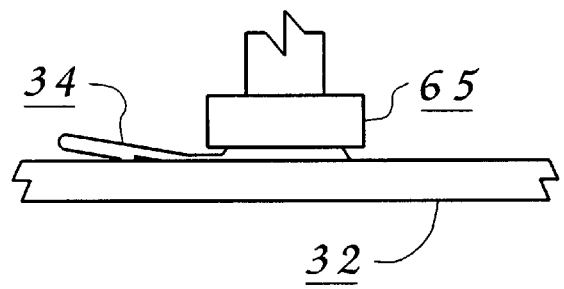
FIG. 7

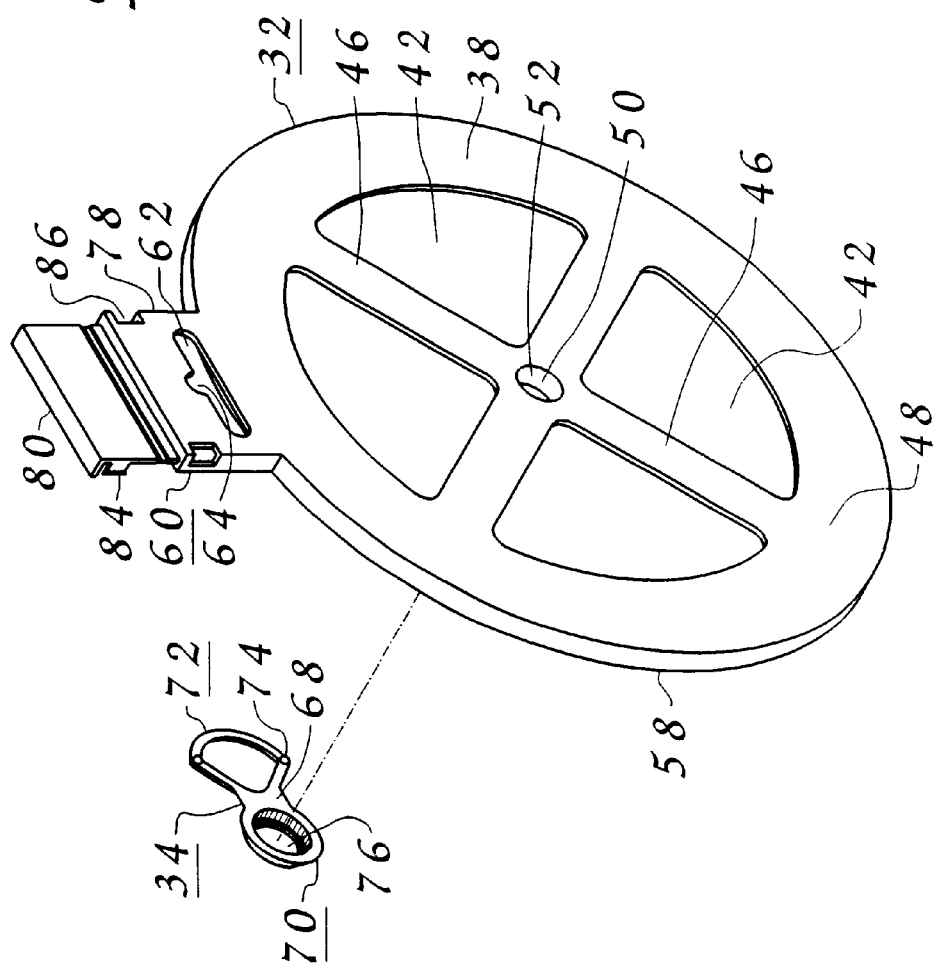

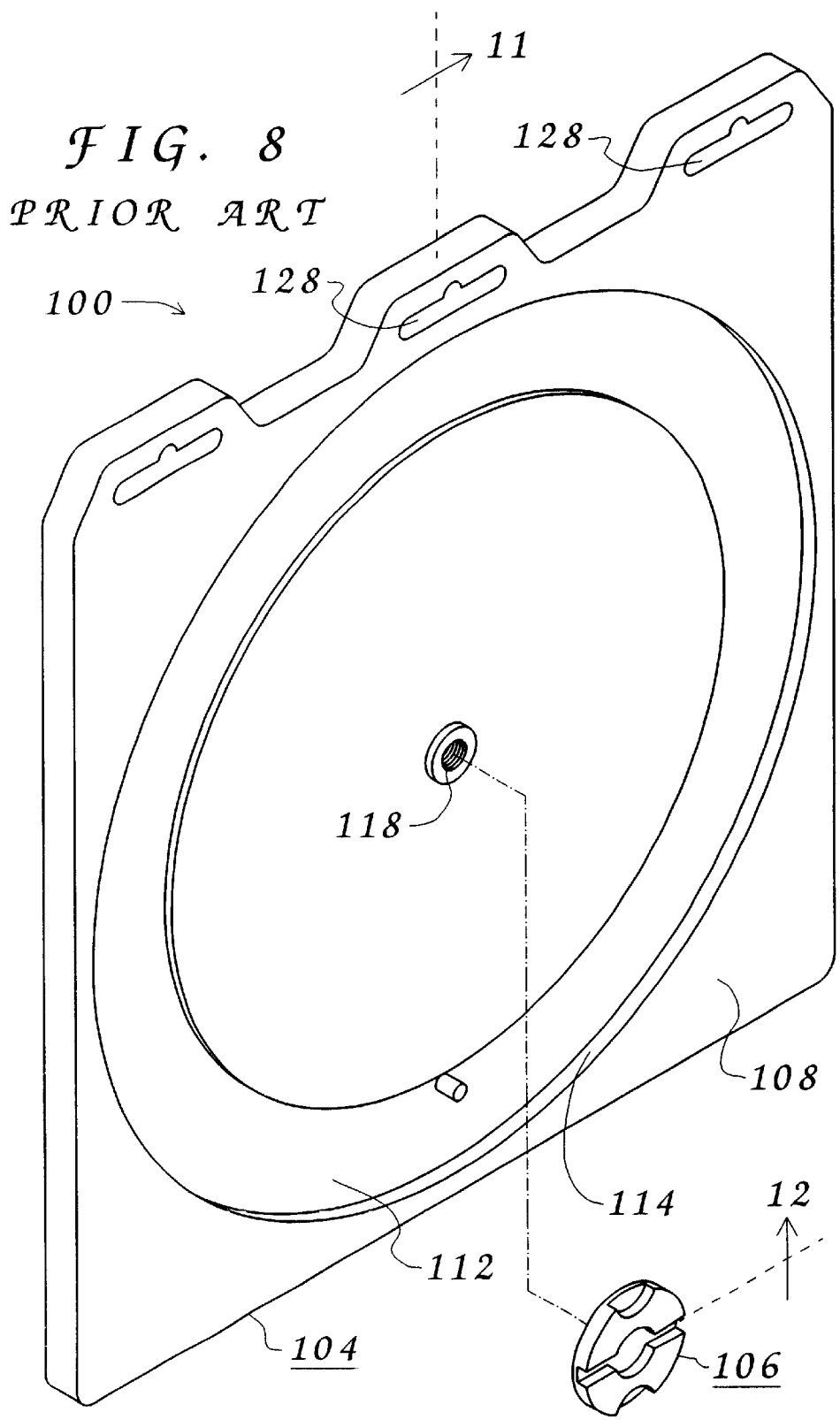

CIRCULAR SAW BLADE HOLDER

BACKGROUND

1. Field of the Invention

Generally, the invention relates to holders for circular saw blades. More specifically, the invention relates to such holders which retain the circular saw blade for display at a point of sale wherein substantially the entire face of the circular saw blade is exposed.

2. Description of the Prior Art

Numerous methods exist to display circular saw blades at a commercial sales outlet where the circular saw blades may be examined by a consumer prior to a sales transaction taking place.

It is known to position the circular saw blades for inspection without any packaging about the circular saw blades. A plurality of identical circular saw blades will often be positioned on a shaft slightly offset from vertical with the central mounting aperture of the circular saw blades engaging the shaft where each circular saw blade may freely rotate about the shaft. Similarly a plurality of identical circular saw blades will often rest on two spaced parallel shafts which extend from a back member. The circular saw blades engage the shafts at the working edge of each respective circular saw blade while the circular saw blades lean against the back member or the preceding circular saw blade. When the circular saw blades are displayed without any packaging it is difficult, if not impossible, to provide for anti theft security devices against potential theft.

The circular saw blade or circular saw blades may be displayed with a packaging thereabout for various useful reasons. These reasons include providing for inclusion of anti theft security devices, providing for a proper rotational orientation of the circular saw blade where printed material on the face of the circular saw blade may readily be examined and presenting the circular saw blade in a more appealing manner.

When a packaging is provided a single circular saw blade may be contained within the packaging, a plurality of identical circular saw blades may be contained within the packaging or a plurality of circular saw blades having unique characteristics may be contained within the packaging. Many types of packaging are known in the art. Examples of applicable packaging include those: of a type which permits the circular saw blade to be removed from the packaging for inspection and replaced in the packaging, of a type which permits touching of the working edge of the circular saw blade without removing the circular saw blade from the packaging, of a type which restricts removal of the circular saw blade from the packaging while permitting visual inspection of the circular saw blade without permitting touching of the working edge of the circular saw blade or of a type which restricts removal of the circular saw blade from the packaging and which does not permit either visual inspection of the circular saw blade nor touching of the working edge of the circular saw blade.

An example of the type which permits the circular saw blade to be removed from the packaging for inspection and replaced in the packaging involves a simple paper sleeve or envelope of paper which may have a transparent window therein where the sleeve or envelope is not sealed.

An example of the type which permits touching of the working edge of the circular saw blade without removing the circular saw blade from the packaging involves a sealed envelope of cardboard which partially surrounds the circular saw blade while leaving at least a portion of the working edge exposed.

An example of the type which restricts removal of the circular saw blade from the packaging while permitting visual inspection of the circular saw blade without permitting touching of the working edge of the circular saw blade involves a cardboard backing panel with the panel and the circular saw blade contained in a transparent wrapping.

An example of the type which restricts removal of the circular saw blade from the packaging and which does not permit either visual inspection of the circular saw blade nor touching of the working edge of the circular saw blade involves a sealed paper sleeve or envelope.

Some packaging methods fall within more than one of the above identified types of packaging. One example of this involves the closest prior art relevant to the present invention and depicted in the drawings and labeled as 'prior art'. This packaging permits full visual inspection of the circular saw blade while attached to the packaging, permits touching of the working edge of the circular saw blade while attached to the packaging and permits removal of the circular saw blade from the packaging and replacement of the circular saw blade relative to the packaging.

Various deficiencies exist with each of the above identified methods of display of circular saw blades and each of the above identified types of packaging for circular saw blades. Additionally, each of the above identified methods of display of circular saw blades and each of the above identified types of packaging for circular saw blades present problems with inclusion of security tags to prevent theft. In the case of individually displayed circular saw blades without any packaging the only option available is to adhesively attach the security tag directly to the circular saw blade where consumers can readily identify the security tag and can easily remove the security tag from the circular saw blade. Due to the thickness of commonly used security tags such attachment renders a plurality of circular saw blades awkward to stack whether stacked vertically or generally horizontally utilizing a shaft or shafts. In the case of circular saw blades in packaging where the circular saw blade may be readily removed from the packaging the security tag may either be adhesively attached to the circular saw blade or to the packaging. In either instance theft of the circular saw blade may readily occur by separating the circular saw blade from the security tag. Depending upon the attachment location of the security tags a similar stacking problem may arise due to the thickness of commonly used security tags. In the case of sealed packaging the security tag may be positioned inside of the packaging to prevent separation of the circular saw blade from the security tag but such packaging also prevents inspection of the circular saw blade by the consumer.

As can be seen various attempts have been made to provide for presentation of circular saw blades and/or packaging of circular saw blades for sale to the public. These attempts have been less efficient than desired. As such, it may be appreciated that there continues to be a need for a circular saw blade holder capable of adequate display of a circular saw blade for inspection, both visual and tactile, by a consumer while the blade is securely attached relative to the circular saw blade holder where the circular saw blade may not be readily removed from the circular saw blade holder or otherwise tampered with and which provides for a secure placement of a security device to reduce the likelihood of theft of the circular saw blade. The present invention substantially fulfills these needs.

SUMMARY

In view of the foregoing disadvantages inherent in the known methods of displaying circular saw blades, your applicant has devised a method of retaining a displayed circular saw blade utilizing a circular saw blade holder. Applicable circular saw blades have a face, a back, a central mounting aperture and a working edge circumferentially disposed about the central mounting aperture. The circular saw blade holder provides for point of sale display of the displayed circular saw blade wherein substantially the entire face of the displayed circular saw blade is exposed for viewing when the displayed circular saw blade is retained by the circular saw blade holder. The circular saw blade holder has a blade contact surface and means to secure the displayed circular saw blade relative to the blade contact surface. The blade contact surface provides for a contact with at least a portion of the back of the displayed circular saw blade when the displayed circular saw blade is retained by the circular saw blade holder. The securing means utilizes the central mounting aperture of the displayed circular saw blade. The securing means also has release means to provide for a single release of the displayed circular saw blade from the circular saw blade holder. The release means prevents a secured replacement of the displayed circular saw blade relative to the circular saw blade holder subsequent to the single release of the displayed circular saw blade from the circular saw blade holder by a consumer.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for means to secure a circular saw blade within a circular saw blade holder wherein substantially the entire face of the circular saw blade is exposed for viewing.

Other objects include;
a) to provide for the means to secure to prevent a secured replacement of the circular saw blade relative to the circular saw blade holder by a consumer subsequent to release of the circular saw blade from the circular saw blade holder.
b) to provide for the means to secure to utilize a bonding of a portion of the circular saw blade holder relative to another portion of the circular saw blade holder utilizing a sonic welding procedure where the circular saw blade is retained between the two portions.
c) to provide for a pull release of the securement of the circular saw blade from the circular saw blade holder.
d) to provide for circular saw blade holder to have a radial perimeter where the circular saw blade holder has a circular shape.
e) to provide for a radially disposed surrounding lip to provide for restricting incidental contact with at least a portion of the working edge of the circular saw blade when retained by the circular saw blade holder.
f) to provide for a hanging portion having an aperture therethrough to extend from the radial perimeter of the circular saw blade holder for positioning the circular saw blade holder in a hanging manner on a retail display hook.
g) to provide for means to contain a security tag on the circular saw blade holder where ready access to a security tag by a consumer is prevented.
h) to provide for the means to contain the security tag to utilize a containment housing sealed utilizing a sonic welding procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 4 is a sectional view of the body of the circular saw blade holder as taken from the section line '4' shown in FIG. 1

FIG. 5 is a sectional view of the pull tab of the circular saw blade holder as taken from the section line '5' shown in FIG. 1.

FIG. 6 is a rear exploded perspective view of the body and pull tab of the circular saw blade holder shown in FIG. 1 through FIG. 3.

FIG. 7 is a side plan view of a portion of the body with the pull tab positioned thereon and a portion of a sonic weld device positioned thereon during a bonding procedure.

FIG. 8 is a front exploded perspective view of a prior art circular saw blade holder having a body and a retaining nut and labeled as 'Prior Art'.

DESCRIPTION

Figure 1:
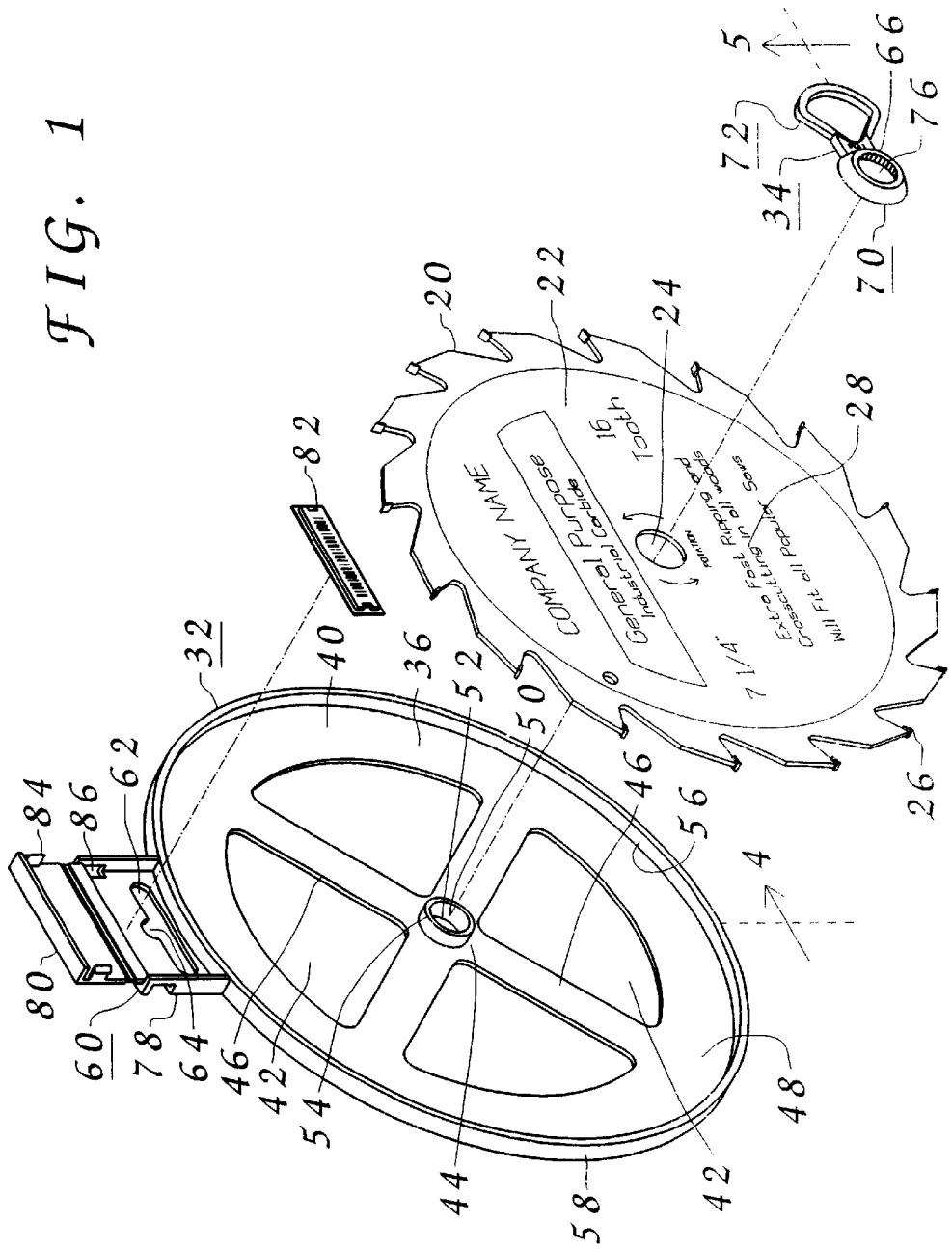
FIG. 1 is a front exploded perspective view of a circular saw blade holder, having a body and a pull tab, and a circular saw blade and a security tag.

Many different systems having features of the present invention are possible. The following description describes the preferred embodiment of select features of those systems and various combinations thereof. These features may be deployed in various combinations to arrive at various desired working configurations of systems.

Reference is hereafter made to the drawings where like reference numerals refer to like parts throughout the various views.

Many types and sizes of circular saw blades may be retained by a circular saw blade holder having features of the present invention for various useful purposes including point of sale display of the displayed circular saw blade. When so retained by the circular saw blade holder the working edge and substantially the entire face of the displayed circular saw blade are exposed for inspection by a consumer including visual inspection as well as tactile inspection of the working edge of the circular saw blade.

Figure 2:
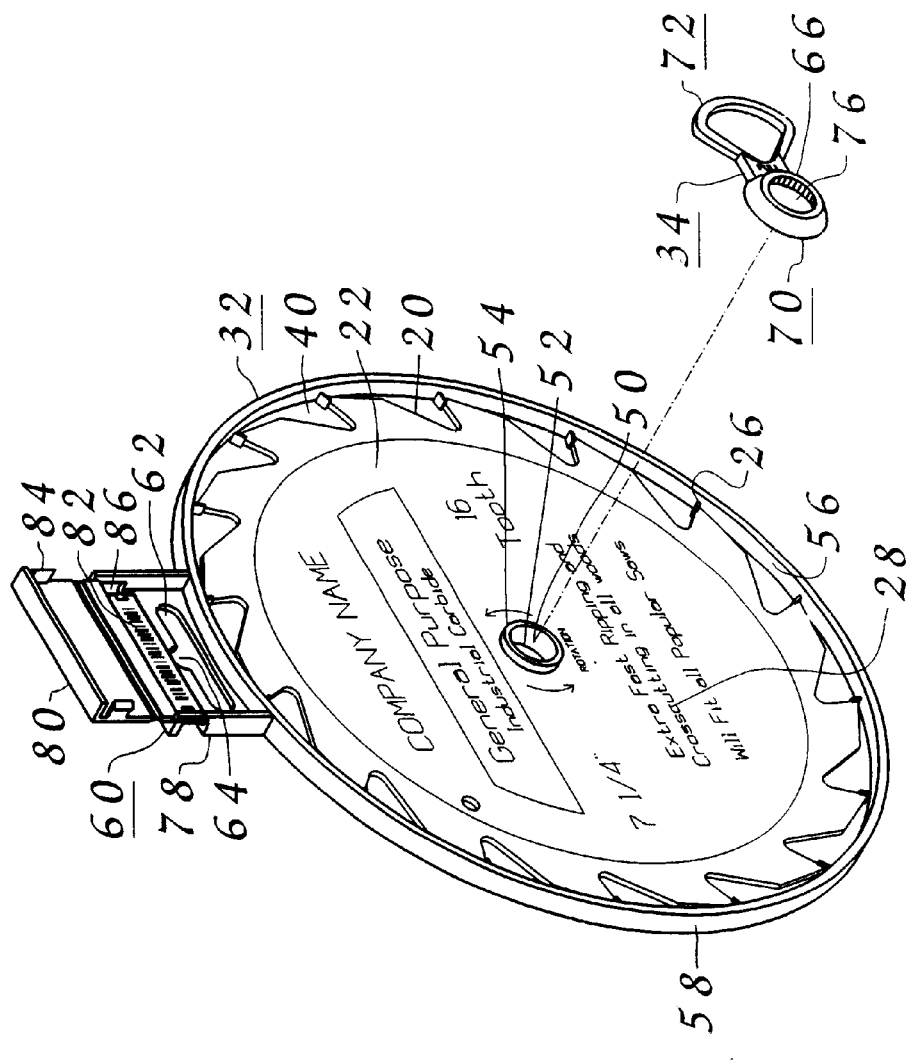
FIG. 2 is an exploded perspective view of the components shown in FIG. 1 with the circular saw blade and the security tag positioned relative to the body of the circular saw blade holder.
Figure 3:
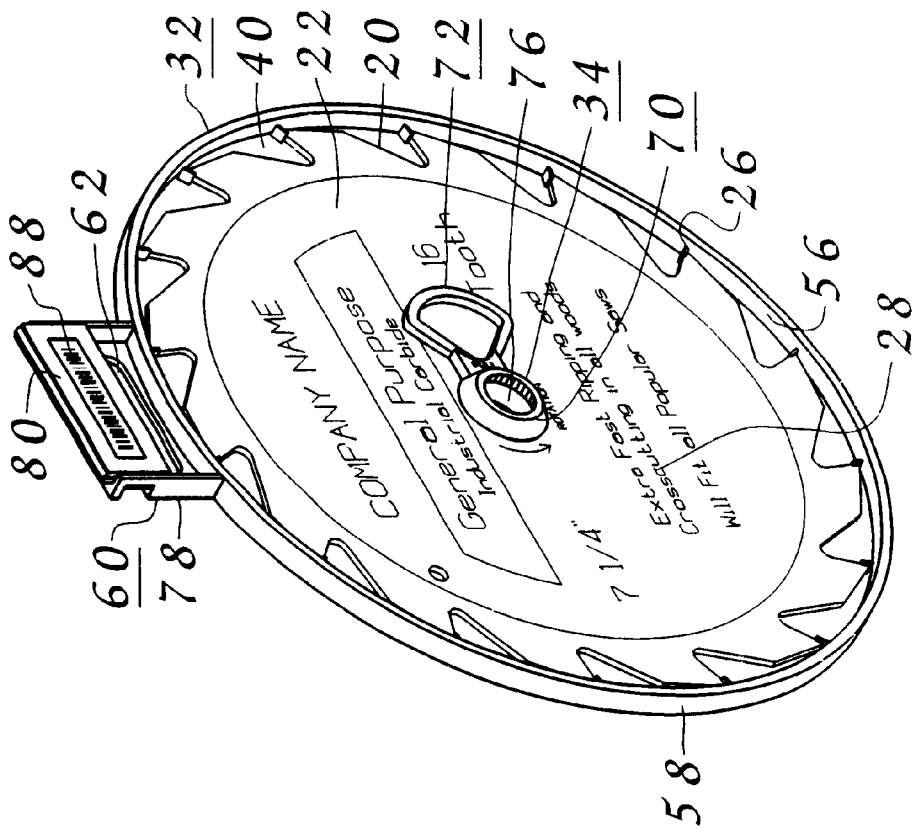
FIG. 3 is a perspective view of a fully assembled circular saw blade holder including placement of the circular saw blade.
Figure 9:
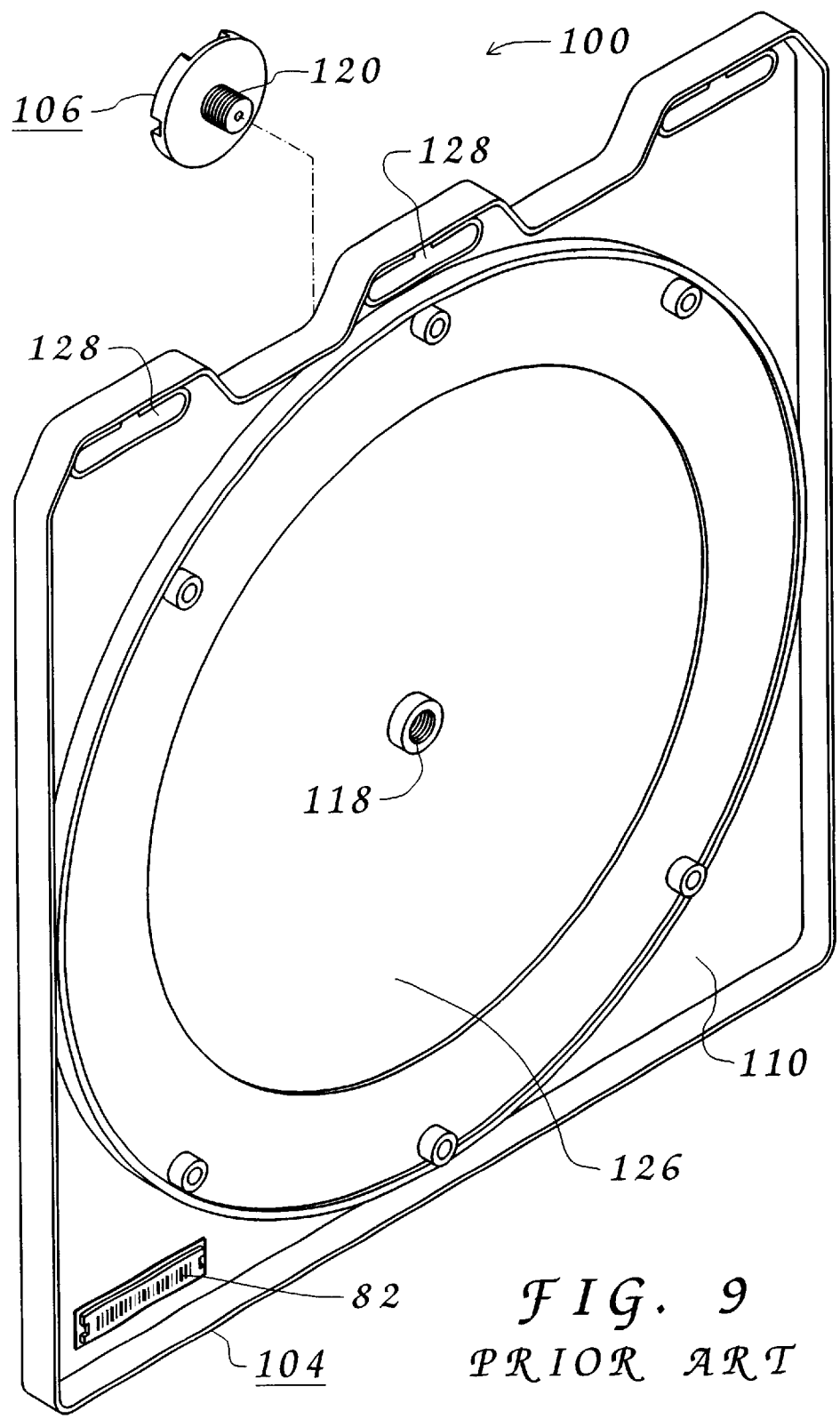
FIG. 9 is a rear exploded perspective view of the assembly shown in FIG. 8 and labeled as 'Prior Art'.
Figure 10:
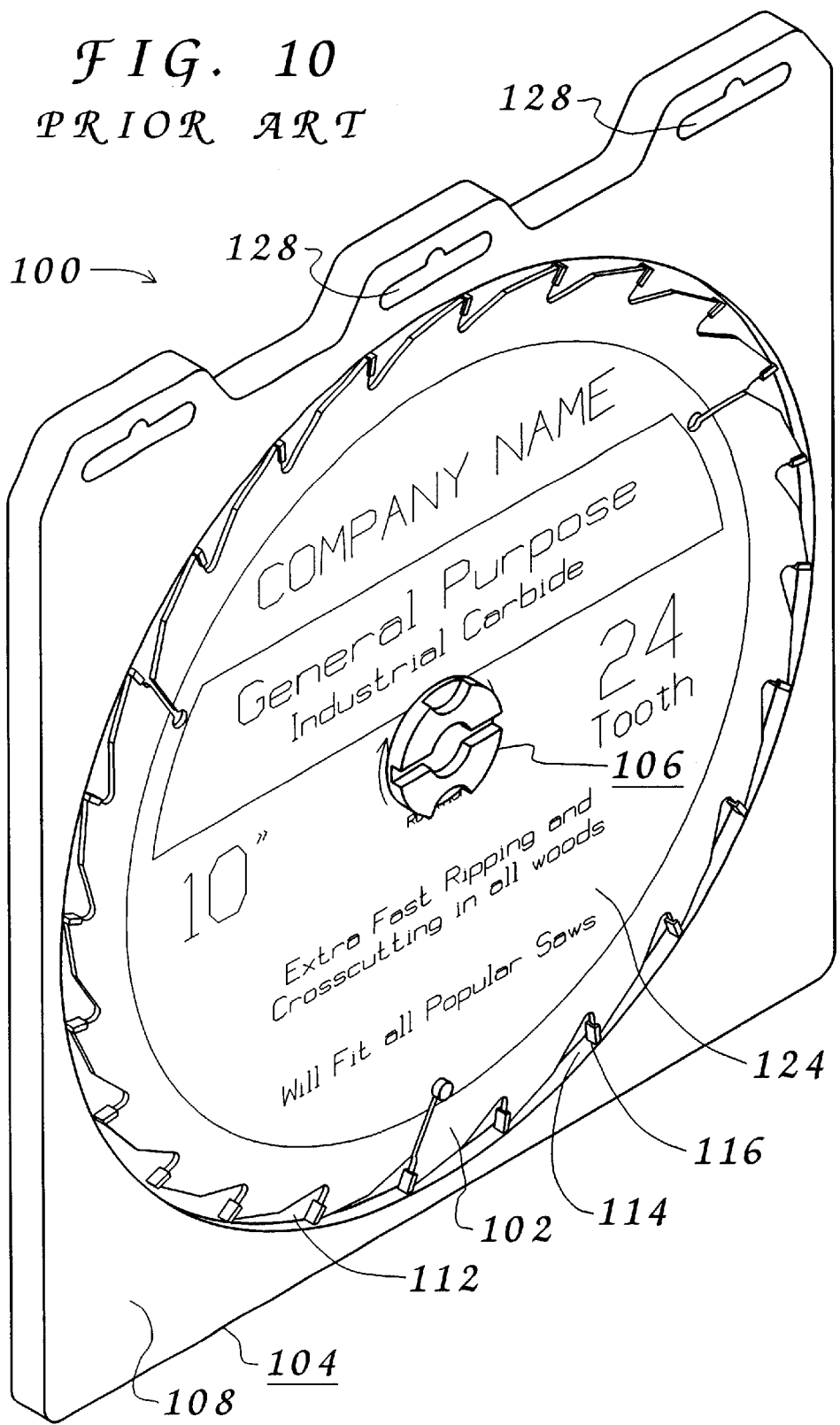
FIG. 10 is a perspective view of the prior art circular saw blade holder shown in FIG. 8 and FIG. 9 with a circular saw blade retained thereon and labeled as 'Prior Art'.
Figure 11:
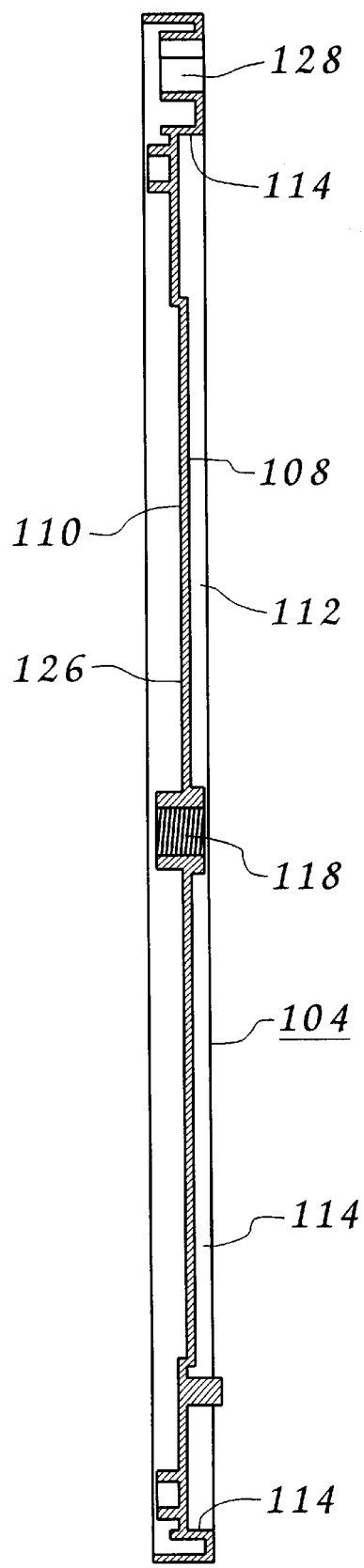
FIG. 11 is a sectional view of the body of the prior art circular saw blade holder as taken from the section line '11' shown in FIG. 8 and labeled as 'Prior Art'.
Figure 12:
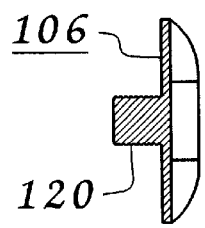
FIG. 12 is a sectional view of the retaining nut of the prior art circular saw blade holder as taken from the section line '12' shown in FIG. 8 and labeled as 'Prior Art'.

An example circular saw blade 20, as conventionally known and shown in FIG. 1 through FIG. 3, has a face 22, a back, not shown, a central mounting aperture 24 and a working edge 26 circumferentially disposed about central mounting aperture 24. As depicted various information 28 associated with a respective blade is often printed on face 22 of circular saw blade 20. Central mounting aperture 24 is conventionally utilized to mount circular saw blade 20 on a circular saw, not shown. Central mounting aperture 24 is utilized by circular saw blade holders having features of the present invention for retention of circular saw blade 20 relative to the respective circular saw blade holder.

Circular saw blade holders having features of the present invention may have various configurations including variations in size and shape. An example is depicted in FIG. 1 through FIG. 6 where a circular saw blade holder 30 has a body 32 and a securing tab 34. Body 32 and securing tab 34 may be formed by various manufacturing methods from various materials. Preferably body 32 and securing tab 34 are each formed from a plastic material utilizing a molding process.

Body 32 has a front 36 and a back 38, see FIG. 6. Body 32 has a blade contact surface 40 to provide for a contact with a portion of the back, not shown in the various views, of a displayed circular saw blade 20. While a solid blade contact surface 40 is possible preferably blade contact surface 40 will utilize as little material as possible to reduce manufacturing costs and reduce weight. To this end a plurality of openings 42 are provided within blade contact surface 40 while retaining structural integrity.

Blade contact surface 40 has a central area 44, a plurality of spokes 46 and a radially disposed section 48. Blade contact surface 40 has a central position 50 which in the embodiment depicted defines a passageway 52 through body 32. Passageway 52 may be utilized to hang circular saw blade holder 30 on a display hook, not shown, in a retail setting. Each spoke 46 extends from central area 44 to radially disposed section 48. The plurality of openings 42 are defined within blade contact surface 40 by each adjacent pair of spokes 46 and radially disposed section 48.

The spokes may have any desired orientation on the circular saw blade holder. Additionally, the deployed spokes may be identical or have a mixture of sizes and/or shapes on the circular saw blade holder. Similarly the openings defined in part by the spokes may have any desired orientation on the circular saw blade holder including a mixture of sizes and/or shapes.

A blade engagement portion 54, a blade engagement post in the embodiment depicted, is radially disposed about passageway 52 and extending generally perpendicularly outward from blade contact surface 40. Blade engagement portion 54 is of a size to provide for radial containment of circular saw blade 20 utilizing central mounting aperture 24 of circular saw blade 20 when retained by circular saw blade holder 30. Passageway 52 is aligned with central mounting aperture 24 of circular saw blade 20 when circular saw blade 20 is retained by circular saw blade holder 30.

A surrounding lip 56 is radially disposed about blade engagement portion 54 and blade contact surface 40 and partially defines a holder perimeter 58. Holder perimeter 58 is radially disposed about central position 50 of blade contact surface 40. Surrounding lip 56 provides for restricting incidental contact with working edge 26 of circular saw blade 20 when circular saw blade 20 is retained by circular saw blade holder 30. This acts to prevent injury to consumers which may result from contact with working edge 26 and also prevents damage to working edge 26 during transport and handling. Preferably holder perimeter 58 does not extend beyond surrounding lip 56 other than for a hanging display portion 60 in order to reduce manufacturing costs and weight. It is possible to provide for additional surface areas beyond surrounding lip 56 for various useful purposes.

Hanging display portion 60 extends from surrounding lip 56. Hanging display portion 60 has a modified slot 62 for the embodiment depicted. Modified slot 62 has a rod engagement portion 64 thereon. Modified slot 62 provides for positioning of circular saw blade holder 30 in a hanging manner on various types of retail display hooks, not shown. Preferably circular saw blade 20 will be oriented during installation on circular saw blade holder 30 where information 28 is positioned relative to hanging display portion 60.

Securing means provides for a securing of circular saw blade 20 utilizing central mounting aperture 24 relative to circular saw blade holder 30 and specifically relative to blade contact surface 40 of circular saw blade holder 30. Many different securement methods and associated structures may be employed to perform this function. Preferably a first securement portion, positioned on body 32 of circular saw blade holder 30, and a second securement portion, being a separate component, cooperate to provide for the securing of circular saw blade 20 relative to circular saw blade holder 30 utilizing an engagement of the first securement portion and the second securement portion together with circular saw blade 20 therebetween. Various engagement methods may be employed to secure the two portions together. Examples of such engagement methods include binding engagement securing, adhesive securing and thermal securing such as sonic welding. In the most preferred embodiment depicted a sonic welding procedure, as conventionally known in the art and not depicted, is employed wherein a vibratory friction is created between the two components to slightly melt the contacting surfaces areas to bind them together.

FIG. 7 depicts a portion of body 32 with pull tab 34 positioned thereon and a portion of a sonic weld device 65 positioned thereon during a bonding procedure, as conventionally known in the art.

Without regard for the engagement method selected it is a strong desire to provide for release means where the retained circular saw blade may easily be removed from the circular saw blade holder. Preferably the release means provides for a single release of the displayed circular saw blade from the circular saw blade holder. This single release prevents a secured replacement by a consumer of a displayed circular saw blade relative to the circular saw blade holder subsequent to the single release. This prevents tampering or substitution of another circular saw blade for the circular saw blade intended for the circular saw blade holder.

It is possible to provide the blade engagement portion with a series of release slots thereon where the bonding between the blade engagement portion and the pull tab is not radially complete but rather has a series of gaps in the bonding to provide for easy release during the pulling procedure to release the secured circular saw blade from the circular saw blade holder.

In the preferred embodiment depicted securing tab 34 is utilized for cooperation with blade engagement post 54 of body 32 to provide the desired securing. Securing tab 34 has a front 66 and a back 68, see FIG. 6. Securing tab 34 anchors to blade engagement post 54 to provide for the securing of the displayed circular saw blade relative to blade engagement post 54. Securing tab 34 has a post engagement portion 70 and a gripping portion 72. Post engagement portion 70 of securing tab 34 slips over blade engagement post 54 of body 32 with circular saw blade 20 positioned on blade engagement post 54 and is secured there utilizing a sonic welding procedure. Gripping portion 72 has opposing elevational humps 74, see FIG. 6, which touch circular saw blade 20 following installation to elevate gripping portion 72 slightly above face 22 of circular saw blade 20 where ready access is provided for the consumer to grip gripping portion 72. In use the consumer grips gripping portion 72 of securing tab 34 and exerts a pulling action to separate securing tab 34 from body 32. Following such removal of securing tab 34 circular saw blade 20 may readily be removed from circular saw blade holder 30. Securing tab 34 has a passageway 76 therethrough which aligns with passageway 52 of body 32 following assembly.

Various anti rotation methods may be employed to prevent circular saw blade 20 from rotating within circular saw blade holder 30 relative to hanging display portion 60. Separate structural elements may be provided on circular saw blade holder 30 to perform this function. When the preferred securing method of sonic welding is employed this is not required due to the tight containment obtainable between blade contact surface 40 and securing tab 34 which prevents rotation of circular saw blade 20 positioned therebetween.

While blade engagement post 54 is depicted as being part of body 32 the portion which engages the interior wall of central mounting aperture 24 of circular saw blade 20 may be positioned on the pull tab portion and secured to body of circular saw blade holder 30 following placement of circular saw blade therebetween.

A security tag, as conventionally known in the art, may be used with the circular saw blade holder. Such security tags have means to operate with a retail security system to prevent theft. Many such security tags will have a bar code printed thereon or attached thereon.

Security tag containment means, depicted in the form of a containment housing 78 and a pivotal door 80, provide for securing of a security tag 82, as conventionally known in the art, therebetween where ready access to security tag 82 by a consumer is prevented. Pivotal door 80 is formed on body 32 of circular saw blade holder 30 during a molding process. This arrangement provides for a pivoting of pivotal door 80 to readily occur relative to containment housing 78 following placement of security tag 82 within containment housing 78. Various securement methods may be employed to seal pivotal door 80 relative to containment housing 78. Examples of such securement methods include binding engagement securing, adhesive securing and thermal securing such as sonic welding. In the example depicted in the various views both binding engagement securing and sonic welding securing are utilized to secure pivotal door 80 relative to containment housing 78. Opposing snap tabs 84 are positioned on pivotal door 80 while opposing engagement slots 86 are positioned on containment housing 78. Following a pivotal displacement of pivotal door 80 relative to containment housing 78 each snap tab 84 engages a respective engagement slot 86 to seal containment housing 78. Following this sealing sonic welding is utilized to secure pivotal door 80 relative to containment housing 78 wherein detectionless tampering is prevented. In the example depicted the structures which provide for the security tag containment means are positioned on hanging display portion 60. Other placement locations are of course possible. While pivotal door 80 is depicted as being formed during a molding process to extend from containment housing 78 a separate component may be provided which attaches relative to containment housing 78. Preferably, as depicted, modified slot 62 of hanging display portion 60 is positioned below the structure which encompasses the security tag containment means. As depicted a separate bar code printed label 88, see FIG. 3, may be attached to circular saw blade holder 30, as shown in FIG. 3, or circular saw blade 20 to permit computerized checkout of the product at a checkout aisle in a retail setting. If desired a more expansive area may be provided which extends into one of the openings defined by the spokes where a label, having a bar code and/or printed information, may be attached for viewing from the rear of the circular saw blade holder.

When the security tag is contained, and concealed, utilizing security tag containment means, the security tag does not have to have a bar code printed thereon. If the security tag does have a bar code printed thereon, that bar code does not have to relate to the product retained by the circular saw blade holder. This provides for use of surplus security tags generally associated with other products for use of the security feature but not the identification feature.

When assembled circular saw blade holder 30, including body 32, circular saw blade 20 and securing tab 34 have a minimal thickness compared to conventionally known circular saw blade holder described below. This provides for a great many assembled circular saw blade holders having features of the present invention to be stacked, either horizontally in a hanging orientation or vertically, in a minimal space.

An information card, not shown, may be attached to circular saw blade holders having features of the present invention. Various placement locations exist for attachment of such information cards. One example involves adhesive attachment to back 38 of body 32 of circular saw blade holder 30. Another example involves placement between blade contact surface 40 of body 32 of circular saw blade holder 30 and the back of circular saw blade 20. In this position the information contained on the information card can be viewed through openings 42. Proper orientation of the information card can be maintained due to the pressure between circular saw blade 20 and blade contact surface 40 or and adhesive may be applied between the information card and portions of blade contact surface 40.

Prior Art

FIG. 7 through FIG. 11, labeled as 'prior art', depict a prior art circular saw blade holder 100 as conventionally known in the art to retain a circular saw blade 102. Circular saw blade holder 100 has a body 104 and a retaining nut 106. Body 104 has a front 108, see FIG. 7 and FIG. 9, and a back 110, see FIG. 8. Both body 104 and retaining nut 106 are formed by a molding process. Body 104 has a depression 112 on front 108 having a radial measurement sufficient to permit placement therein of circular saw blade 102. A radially disposed outer wall 114 of depression 112 provides for protection of a working edge 116 of circular saw blade 102 when positioned within depression 112, see FIG. 9. A threaded passageway 118 receives threads 120 of retaining nut 106 to secure circular saw blade 102 relative to depression 112 of body 104, see FIG. 9. Retaining nut 106 is rotationally positioned within threaded passageway 118 and may easily be removed from threaded passageway 118 to release circular saw blade 102 from body 104. Such ready removal of circular saw blade 102 from body 104 of circular saw blade holder 100 eliminates any potential security measures from being employed with circular saw blade holder 100 by the retailer. Additionally, circular saw blade holder 100 does not have a passageway corresponding to a central mounting aperture, not shown, of circular saw blade 102.

Circular saw blade holder 100 has the advantage over many retail display methods for circular saw blade of displaying substantially the entire face 124 of circular saw blade 102 where ready inspection by the consumer may occur and where the consumer may touch circular saw blade 102 during the inspection process. Additionally, an information card, not shown, may be attached to back 110 to advise the consumer of features of the product including safety warnings. The information card has a central aperture and is adhesively attached to a plate surface 126 of back 110.

Body 104 of circular saw blade holder 100 has a generally square shape which requires a great deal of material which are beyond the limits of depression 112. This configuration makes circular saw blade holder 100 much more expensive to manufacture than circular saw blade holders having features of the present invention. Additionally, circular saw blade holder 100, due to the shape, weighs more than circular saw blade holders having features of the present invention thus increasing costs associated with shipping.

In conventional usage security tag 82 typically is adhesively attached to back 110 of body 104, see FIG. 8, where security tag 82 is visible and accessible to the consumer. Such placement renders the benefits of deployment of security tag 82 virtually useless. Security tag 82 may simply be removed by the consumer eliminating the advantages of such security tags. Even worse a security tag, including the bar code identification associated with another specific product, may be taken from a less expensive circular saw blade by a dishonest consumer and placed on circular saw blade holder 100 having a more expensive circular saw blade while removing the security tag originally attached to circular saw blade holder 100. At this point the dishonest consumer may simply present circular saw blade holder 100, with an expensive circular saw blade 102 retained thereon, at a checkout and gain possession of the expensive circular saw blade 102 while paying substantially less than required.

Body 104 of circular saw blade holder 100 has a series of slots 128 positioned across an upper extent to permit hanging display of circular saw blade holder 100 in a retail setting. The middle slot 128 is used when a single support rod, not shown, is utilized for display. When two (2) spaced support rods are utilized for display typically the opposing outer slots 128 are used. During display typically a plurality of circular saw blade holders 100 are positioned on the deployed rod(s).

With respect to the above description then, it is to be realized that the optimum dimensional relationships for the parts of the invention, to include variations in size,. material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A circular saw blade holder to retain a displayed circular saw blade, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, the circular saw blade holder comprising:

a) a blade contact surface to provide for a contact with at least a portion of the back of the displayed circular saw blade when the displayed circular saw blade is retained by the circular saw blade holder;

b) securing means for securing the displayed circular saw blade relative to the blade contact surface when the displayed circular saw blade is retained by the circular saw blade holder, the securing means utilizing the central mounting aperture of the displayed circular saw blade and wherein the securing means further comprises release means for release of the central mounting aperture of the displayed circular saw blade from the circular saw blade holder, the release means for a single release of the displayed circular saw blade from the circular saw blade holder wherein a secured replacement of the displayed circular saw blade relative to the circular saw blade holder subsequent to the single release of the displayed circular saw blade from the circular saw blade holder by a consumer is prevented.

2. The circular saw blade holder defined in claim 1 further comprising a blade engagement post extending generally perpendicularly relative to the blade contact surface, the blade engagement post to provide for radial containment of the displayed circular saw blade utilizing the central mounting aperture of the displayed circular saw blade when the displayed circular saw blade is retained by the circular saw blade holder and wherein the securing means further comprises a securing tab for anchoring to the blade engagement post to provide for the securing of the displayed circular saw blade relative to the blade engagement post when the displayed circular saw blade is retained by the circular saw blade holder.

3. The circular saw blade holder defined in claim 1 further comprising a passageway through the circular saw blade holder and wherein the passageway is aligned with the central mounting aperture of the displayed circular saw blade when the displayed circular saw blade is retained by the circular saw blade holder.

4. The circular saw blade holder defined in claim 1 further comprising a holder perimeter radially disposed about a central position of the blade contact surface.

5. The circular saw blade holder defined in claim 1 further comprising security tag containment means for securing a security tag therein where ready access to the security tag by a consumer is prevented.

6. A circular saw blade holder to retain a displayed circular saw blade, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, the circular saw blade holder comprising:
   a) a blade contact surface to provide for a contact with at least a portion of the back of the displayed circular saw blade when the displayed circular saw blade is retained by the circular saw blade holder;
   b) securing means for securing the displayed circular saw blade relative to the blade contact surface when the displayed circular saw blade is retained by the circular saw blade holder, the securing means utilizing the central mounting aperture of the displayed circular saw blade and wherein the securing means further comprises release means for a single release of the displayed circular saw blade from the circular saw blade holder wherein a secured replacement of the displayed circular saw blade relative to the circular saw blade holder subsequent to the single release of the displayed circular saw;
   c) a first securement portion and a second securement portion and wherein the securing means further comprises a bonding of the first securement portion and the second securement portion together utilizing a sonic welding procedure.

7. A circular saw blade holder to retain a displayed circular saw blade, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, the circular saw blade holder comprising:
   a) a blade contact surface to provide for a contact with at least a portion of the back of the displayed circular saw blade when the displayed circular saw blade is retained by the circular saw blade holder;
   b) securing means for securing the displayed circular saw blade relative to the blade contact surface when the displayed circular saw blade is retained by the circular saw blade holder, the securing means utilizing the central mounting aperture of the displayed circular saw blade and wherein the securing means further comprises release means for a single release of the displayed circular saw blade from the circular saw blade holder wherein a secured replacement of the displayed circular saw blade relative to the circular saw blade holder subsequent to the single release of the displayed circular saw;
   c) a first securement portion and a second securement portion and wherein the securing means further comprises an engagement between the first securement portion and the second securement portion and wherein the release means further comprises a pulling action on the second securement portion relative to the first securement portion.

8. A circular saw blade holder to retain a displayed circular saw blade, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, the circular saw blade holder comprising:
   a) a blade contact surface to provide for a contact with at least a portion of the back of the displayed circular saw blade when the displayed circular saw blade is retained by the circular saw blade holder;
   b) a blade engagement portion to provide for a contact with at least a portion of the displayed circular saw blade defining the central mounting aperture of the displayed circular saw blade when the displayed circular saw blade is retained by the circular saw blade holder;
   c) securing means for securing the displayed circular saw blade relative to the blade engagement portion utilizing the central mounting aperture of the displayed circular saw blade and wherein the securing means further comprises release means for release of the central mounting aperture of the displayed circular saw blade from the circular saw blade holder, the release means for a single release of the displayed circular saw blade from the circular saw blade holder wherein a secured replacement of the displayed circular saw blade relative to the circular saw blade holder subsequent to the single release of the displayed circular saw blade from the circular saw blade holder by a consumer is prevented;
   d) a holder perimeter radially disposed about the blade engagement portion.

9. The circular saw blade holder defined in claim 8 wherein the blade contact surface further comprises a central area and a plurality of openings radially disposed about the central area.

10. The circular saw blade holder defined in claim 8 further comprising a blade engagement post extending generally perpendicularly relative to the blade contact surface, the blade engagement post to provide for radial containment of the displayed circular saw blade utilizing the central mounting aperture of the displayed circular saw blade when the displayed circular saw blade is retained by the circular saw blade holder and wherein the securing means further comprises a securing tab for anchoring to the blade engagement post to provide for the securing of the displayed circular saw blade relative to the blade engagement post when the displayed circular saw blade is retained by the circular saw blade holder.

11. The circular saw blade holder defined in claim 8 further comprising a hanging display portion extending from the holder perimeter, the hanging display portion having an aperture therethrough for positioning of the circular saw blade holder in a hanging manner on a retail display hook.

12. The circular saw blade holder defined in claim 8 further comprising a surrounding lip radially disposed about the blade engagement portion, the surrounding lip to provide for restricting incidental contact with at least a portion of the working edge of the displayed circular saw blade when the displayed circular saw blade is retained by the circular saw blade holder.

13. The circular saw blade holder defined in claim 8 further comprising security tag containment means for securing a security tag therein where ready access to the security tag by a consumer is prevented.

14. A circular saw blade holder to retain a displayed circular saw blade and secure a security tag, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, applicable security tags having means to operate with a retail security system to prevent theft, the circular saw blade holder comprising:
   a) a blade contact surface to provide for a contact with at least a portion of the back of the displayed circular saw blade when the displayed circular saw blade is retained by the circular saw blade holder;
   b) securing means for securing the displayed circular saw blade relative to the blade contact surface when the displayed circular saw blade is retained by the circular saw blade holder;
   c) security tag containment means for securing the security tag therein where ready access to the security tag by a consumer is prevented and wherein the security tag containment means further comprises a containment housing and a pivotal door, the containment housing to receive the security tag, the pivotal door to close the containment housing.

15. A circular saw blade holder to retain a displayed circular saw blade and secure a security tag, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, applicable security tags having means to operate with a retail security system to prevent theft, the circular saw blade holder comprising:
   a) a blade contact surface to provide for a contact with at least a portion of the back of the displayed circular saw blade when the displayed circular saw blade is retained by the circular saw blade holder;
   b) securing means for securing the displayed circular saw blade relative to the blade contact surface when the displayed circular saw blade is retained by the circular saw blade holder;
   c) security tag containment means for securing the security tag therein where ready access to the security tag by a consumer is prevented and wherein the security tag containment means further comprises a first containment portion, a second containment portion and a bonding of the first containment portion and the second containment portion together utilizing a sonic welding procedure.

16. A circular saw blade holder to retain a displayed circular saw blade and secure a security tag, applicable circular saw blades having a face, a back, a central mounting aperture and a working edge circumferentially disposed about the central mounting aperture, the circular saw blade holder for point of sale display of the displayed circular saw blade wherein substantially the entire face of the displayed circular saw blade is exposed for viewing when the displayed circular saw blade is retained by the circular saw blade holder, applicable security tags having means to operate with a retail security system to prevent theft, the circular saw blade holder comprising:
   a) a blade contact surface to provide for a contact with at least a portion of the back of the displayed circular saw blade when the displayed circular saw blade is retained by the circular saw blade holder; b) securing means for securing the displayed circular saw blade relative to the blade contact surface when the displayed circular saw blade is retained by the circular saw blade holder;
   c) security tag containment means for securing the security tag therein where ready access to the security tag by a consumer is prevented and wherein the security tag containment means further comprises a first containment portion, a second containment portion and a bonding of the first containment portion and the second containment portion together and wherein the first containment portion further has a hanging aperture therethrough for positioning of the circular saw blade holder in a hanging manner on a retail display hook.

* * * * *